United States Patent [19]

Pak et al.

[11] Patent Number: 4,765,998

[45] Date of Patent: Aug. 23, 1988

[54] EDIBLE FOOD PRODUCT

[76] Inventors: Tong S. Pak; Tae S. Pak, both of 802 S. Race St., Van Wert, Ohio 45891

[21] Appl. No.: 924,261

[22] Filed: Oct. 29, 1986

[51] Int. Cl.4 ............................................. A23L 1/31
[52] U.S. Cl. ..................................... 426/92; 426/274; 426/138
[58] Field of Search ............... 426/128, 138, 274, 275, 426/92, 94

[56] References Cited

U.S. PATENT DOCUMENTS

| | | | |
|---|---|---|---|
| 1,807,189 | 5/1931 | Bemis | 426/92 |
| 2,156,145 | 4/1939 | Cavett et al. | 426/138 |
| 2,892,719 | 6/1959 | Lynn | 426/138 |
| 3,290,154 | 12/1966 | Tuner | 426/139 |
| 3,821,425 | 6/1974 | Russell | 426/134 |
| 4,205,091 | 5/1980 | Van Horne | 426/139 |
| 4,463,021 | 7/1984 | Eufemia | 426/138 |
| 4,472,440 | 9/1984 | Bank | 426/138 |

*Primary Examiner*—Donald E. Czaja
*Assistant Examiner*—Mary S. Mims
*Attorney, Agent, or Firm*—Birch, Stewart, Kolasch & Birch

[57] ABSTRACT

A hamburger food product comprising two slices of bread having inserted therebetween a meat product and a container, the container disposed on the top surface of the hamburger meat adapted to house a salad therein and structured to contain a concave configuration disposed at the bottom surface having a circular edge portion for causing the container to tightly adhere to the meat product.

5 Claims, 1 Drawing Sheet

U.S. Patent     Aug. 23, 1988     4,765,998
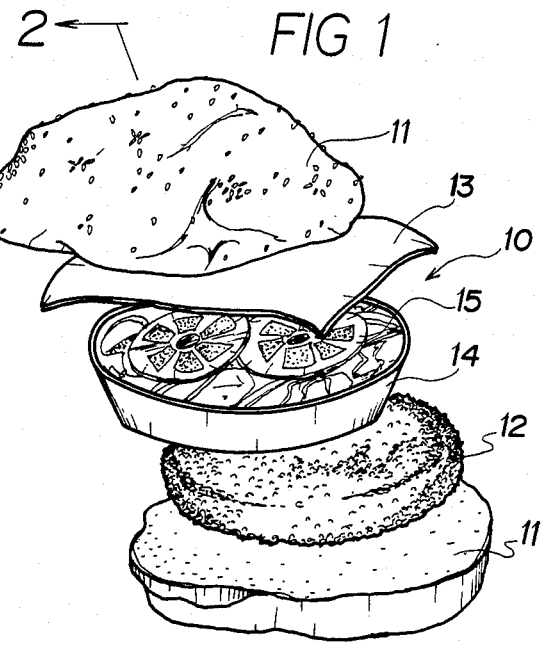
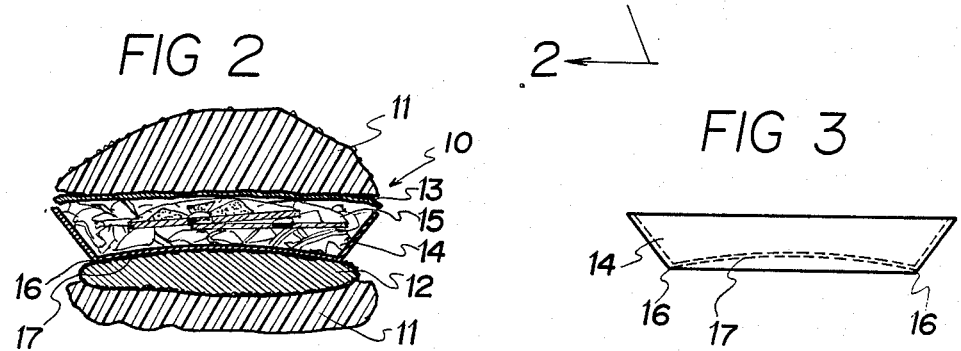
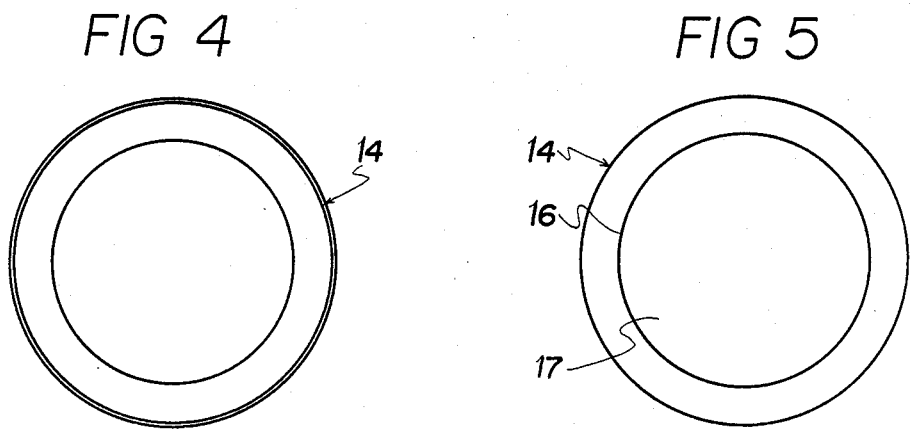

EDIBLE FOOD PRODUCT

BACKGROUND OF THE INVENTION

1. Field of the Invention

The present invention relates to an edible food product. More particularly, the present invention relates to a food product such as hamburger sandwich or other equivalent product which contains an edible container disposed therein for holding a large quantity of fresh salad.

2. Description of the Prior Art

Over the years the american sandwich, such as for example the hamburger, has become a truly national food. In fact, the popularity of the hamburger today has accelerated such that it probably enjoys a popularity equal to or greater than that of all other sandwiches. In keeping with the ever increasing demand for sandwiches such as hamburgers, the food industry has converted what was traditionally a food requiring many hours in the making into a fast food product. Also, in the ever increasing demand for hamburgers and other sandwiches containing a large quantity of fresh salad such as slices of pickles, slices of tomatoes, slices of onions and a garnish such as lettuce, the industry has provided restaurants with salad bars for use in garnishing sandwiches such as hamburger. However, in this matter, it is difficult to insert large quantities of garnish material into the hamburgers since the materials tend to fall from the hamburger.

Because of the desire to provide salad type garnish for sandwiches which can be readily incorporated into the sandwich and easily eaten while avoiding undue mess, many attempts have been made to facilitate the manner in which salad is added to a sandwich. None of these attempts can actually claim to have succeeded in this regard. Consider, for example, U.S. Pat. No. 1,807,189 to Bemis which discloses a food product such as a sandwich wherein a bun is split at its sides and bottom end to form a pocket and a garnished filler made of solid edibles, is inserted into the pocket. These fillers often consist of a garnish in the form of lettuce, a meat product or hot-dogs, and a further garnish or appetizer in the form of pickle slices. However, since the garnish is assembled together with the hot meat product recently cooked, the fresh lettuce and cold pickle in the pocket of the Bemis patent is converted to a warm salad. Furthermore, it is difficult to insert fillers in all quantities into the pocket of the Bemis patent.

OBJECTS AND SUMMARY OF THE INVENTION

Accordingly, it is an object of the present invention to provide an improved food product containing an edible container disposed therein and a process of making the same.

Another object of the present invention is to provide a food product containing an edible dish inserted between two slices of bread, said dish adapted to contain a large quantity of salad such as lettuce, tomatoes, onions and/or pickles, and the like for eating with the meat and providing sufficient salad for good health.

A further object of the present invention is to provide a sandwich, such as a hamburger which contains a dish disposed therein which is structured with a concave configuration disposed at the bottom surface thereof and a circular convex portion disposed along the edge thereof whereby the edible dish is adapted to be added to the meat sandwich.

Still another object of the present invention is to provide a hamburger which contains a edible dish disposed therein which is structured with a V-shaped configuration to allow for convenient stacking during storage.

Other objects and further scope of applicability of the present invention will become apparent form the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a food product including an edible container disposed therein for housing a salad. The edible container comprises a concave configuration disposed at the surface of the bottom thereof and a circular convey portion disposed along the edge thereof for causing the container to tightly adhere to the meat disposed in the sandwich product.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIG. 1 is a perspective view of a hamburger containing the edible dish of the present invention;

FIG. 2 is a cross-sectional view taken along line 2—2 of FIG. 1;

FIG. 3 is a front elevational view of the edible dish of the present invention;

FIG. 4 is a top plan view of the edible dish of the present invention; and

FIG. 5 is a bottom plan view of the edible dish of the present invention.

DESCRIPTION OF THE PREFERRED EMBODIMENTS

The present invention is unique in that it is distinguishable from a hamburger which is made-to-order, even though it appears similar to such a hamburger. The reason for this is probably due most significantly to the fact that the edible container contains a large quantity of salad therein and also to the fact that the specially configurated container tightly adheres to the meat in the hamburger. Advantageously the fresh and cold salad although disposed next to the hot cooked meat, remains fresh and secured within the edible container and thus does not scatter from the sandwich so that the consumer can eat a lot of fresh salad with the meat e.g. hamburger for good health.

Referring now in detail to the drawing for the purpose of illustrating the present invention, the food product, for example the hamburger 10 as shown in FIGS. 1 and 2, includes an edible container 14 for housing a salad 15 such as slices of tomatoes, onions, pickles, lettuce, cabbages and/or the like. And the food product 10 further includes a two slices of bread 11, a piece of meat e.g. hamburger 12, recently cooked and a slice of cheese 13.

As shown in FIGS. 3, 4 and 5, the edible container 14 such as an edible dish comprises 18 having a circular edge portion 16 to form a center concave portion 17 for engaging a portion of the piece of meat e.g. hamburger 12 disposed therein for being adapted to adhere to the top surface of the piece of meat e.g. hamburger 12 (FIG. 2).

Also, the dish 14 can be formed into a V-shaped configuration to allow for convenient stacking during storage (FIG. 3).

Usually, the meat e.g. hamburger 12 is cooked immediately before the hamburger 10 is sold or eaten. Therefore, the hot meat e.g. hamburger 12 cooks the fresh and cold salad 15. However, according to the present invention, the use of the edible container 14 which houses the fresh and cold salad 15 therein prevents the salad 15 from being cooked and at the same time prevents the salad 15 from falling from the sandwich 10. The edible container such as dish 14 is made of edible materials such as potato, wheat flour, and/or rice and cooked in a conventional manner. The dish 14 of the present invention is conventionally reconstituted such as by broiling, frying in oil and/or baking.

When the dish 14 is made mainly of potato, for example in an amount of 80% by weight, then fried in oil and inserted in the hamburger 10 according to the present invention, the conventional hamburger improved with a french fried potato chip filler.

In process, the container such as the dish 14 described above is filled with salad 15 such as slices of tomatoes, onions, lettuces, cabbages and/or pickles. The dish 14 is then placed next to the top surface the hot cooked meat e.g. hamburger 12 which is placed on one slice of bread 11. The cheese 13 and the other slice of bread 11 is placed on top of the edible dish 14 containing the salad 15 (FIG. 2). Since the dish 14 is made mainly of potato, additional fried potato chips are unnecessary. In order to mass-produce, many dished 14 containing the salad 15 therein are pre-prepared and can be added to hamburgers as they are produced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

We claim:

1. A sandwich comprising:
   two slices of bread having inserted therebetween a meat product and an edible container disposed on the surface of said meat product, said edible container housing a salad therein and structured to contain a concave configuration disposed at the bottom surface having a circular edge portion for causing the edible container to tightly adhere to the meat product whereby the salad is separated from the meat product to maintain its fresh condition while at the same time prevented from falling from the sandwich.

2. The sandwich of claim 1 wherein the container is a dish.

3. The sandwich of claim 2 wherein the dish has a V-shaped configuration to allow for convenient stacking during storage.

4. The sandwich of clam 1 wherein the container is made of a material of selected from the group consisting of potato, wheat, rice and a mixture thereof.

5. The sandwich of claim 3 wherein the container is made of potato.

* * * * *